US012656192B2

(12) United States Patent
Gebhardt et al.

(10) Patent No.: US 12,656,192 B2
(45) Date of Patent: Jun. 16, 2026

(54) METHOD FOR VALIDATING AN INVASIVE TEMPERATURE MEASUREMENT SYSTEM

(71) Applicant: ABB Schweiz AG, Baden (CH)

(72) Inventors: Joerg Gebhardt, Mainz (DE);
Guruprasad Sosale, Munich (DE);
Wilhelm Daake, Petershagen (DE);
Karsten Schroeder, Petershagen (DE);
Subhashish Dasgupta, Bangalore (IN);
Patric Ackermann, Fischbachtal (DE);
Horst Schwanzer, Langenselbold (DE)

(73) Assignee: ABB Schweiz AG, Baden (CH)

( * ) Notice: Subject to any disclaimer, the term of this patent is extended or adjusted under 35 U.S.C. 154(b) by 262 days.

(21) Appl. No.: 18/328,025

(22) Filed: Jun. 2, 2023

(65) Prior Publication Data

US 2023/0314241 A1     Oct. 5, 2023

Related U.S. Application Data

(63) Continuation of application No. PCT/EP2021/084200, filed on Dec. 3, 2021.

(30) Foreign Application Priority Data

Dec. 3, 2020     (EP) ..................................... 20211675

(51) Int. Cl.
  G01K 15/00          (2006.01)
  G01J 5/02          (2022.01)
        (Continued)

(52) U.S. Cl.
  CPC .............. G01K 15/007 (2013.01); G01J 5/02 (2013.01); G01K 1/024 (2013.01); G01J 2005/0077 (2013.01)

(58) Field of Classification Search
  None
  See application file for complete search history.

(56) References Cited

U.S. PATENT DOCUMENTS

| | | | |
|---|---|---|---|
| 2005/0281313 A1* | 12/2005 | Qian ...................... | G16H 50/30 |
| | | | 702/131 |
| 2011/0067498 A1* | 3/2011 | Yamamoto ............ | G01S 15/899 |
| | | | 73/632 |

(Continued)

FOREIGN PATENT DOCUMENTS

| | | |
|---|---|---|
| CN | 105509928 A | 4/2016 |
| CN | 110297009 A | 10/2019 |

(Continued)

OTHER PUBLICATIONS

European Patent Office, International Search Report in International Patent Application No. PCT/EP2021/084200, 3 pp. (Mar. 18, 2022).

(Continued)

*Primary Examiner* — Erica S Lin
(74) *Attorney, Agent, or Firm* — Fitch Even Tabin & Flannery LLP

(57)          ABSTRACT

A method for validating an invasive temperature measurement system includes providing a first temperature data of the invasive temperature measurement system of a medium, the medium surrounded by a vessel wall enclosing the medium; providing a second temperature data of a non-invasive temperature measurement system, the non-invasive temperature measurement system thermally contacting an outside surface of the vessel wall enclosing the medium; determining a temperature of the medium based on the second temperature data medium properties and properties of the vessel wall; and comparing the first temperature data with the determined temperature of the medium to validate the invasive temperature measurement system.

13 Claims, 2 Drawing Sheets

(51) Int. Cl.
G01K 1/024 (2021.01)
*G01J 5/00* (2022.01)

(56) References Cited

U.S. PATENT DOCUMENTS

2017/0212065 A1   7/2017   Rud et al.
2019/0293497 A1   9/2019   Rud et al.
2020/0198219 A1*   6/2020   Tang ........................ G01J 5/56

FOREIGN PATENT DOCUMENTS

EP         1344033 A0   9/2003
WO    2019170778 A1   12/2019

OTHER PUBLICATIONS

European Patent Office, Written Opinion in International Patent Application No. PCT/EP2021/084200, 7 pp. (Mar. 18, 2022).
European Patent Office, Extended European Search Report in European Patent Application No. 20211675.2, 10 pp. (May 27, 2021).
English translation of Office Action and Search Report dated Jan. 31, 2026, issued in Chinese Application No. 2021800815778, 16 pages.

* cited by examiner

METHOD FOR VALIDATING AN INVASIVE TEMPERATURE MEASUREMENT SYSTEM

CROSS-REFERENCE TO RELATED APPLICATIONS

The present application claims priority to International Patent Application No. PCT/EP2021/084200, filed on Dec. 3, 2021, and to European Patent Application No. 20211675.2, filed on Dec. 3, 2020, each of which is incorporated herein in its entirety by reference.

FIELD OF THE DISCLOSURE

The present disclosure generally relates to measurement systems and, more particularly, to a method for validating an invasive temperature measurement system.

BACKGROUND OF THE INVENTION

Temperature measurements are vital for safe running of facilities, because the temperature being often among the main control parameters for ensuring quality or efficiency of the process. Small deviations in temperature can lead to immense differences in energy or transactional costs given the volume of flow or material per second.

Typical temperature measurement installations involve welding or screwing the installation in a protective sheath such as mounting a thermowell or some other packaging of the sensor into the piping or pipe wall, and then placing a measurement inset, as e.g. a resistive temperature detector (RTD) or Thermocouple, into the thermowell to perform a measurement of the temperature.

Ensuring that temperature measurements of process media are accurate and repeatable is critical. The standard approach is to remove the measurement inset and check its accuracy in a calibration bath. For this approach, there are established standards and practices. A primary drawback of this measurement approach is that it often does not provide an accuracy estimation of the media temperature, because the measurement inset, after calibration, e.g., is placed in the thermowell or other packaging with no reference measurement of the accuracy of the entire system including the thermowell and the inset in a of the medium. To remove temperature inset rods in cases where they are installed without thermowell is generally cumbersome since it has to be assured that no damage is caused by medium leakage through the installation opening.

BRIEF SUMMARY OF THE INVENTION

Measurement errors using a thermowell may be related to:
a size of the thermowell not fitting to the inset, because of air gaps caused by poor tolerancing and resulting in inaccuracies of the temperature measurements;
thermic coupling of the typically metallic thermowell to ambient conditions resulting in not matching the true medium temperature;
disturbing of the local flow field of the medium by the thermowell generating flow separation and/or vortexes resulting in temperature measurement errors and device vibration;
erosion and sludge deposition originated by the thermowell directly facing the media flow.

Installation of a second identical thermowell assembly along the same piping may provide a system level accuracy, by comparing the resulting temperature readings from the two thermowell assemblies. Setting a tolerance for a deviation of the temperature readings of the two thermowell assemblies may verify the accuracy of the overall temperature measurement system.

A drawback of this method is that it is invasive resulting in a requirement of an additional level of engineering and installation cost as the first thermowell. Additionally it cannot be carried out on a running process without special care and it cannot be used to validate existing thermowell assemblies. What is lacking is a method to validate the accuracy of a general invasive, e.g. thermowell based, temperature measurement system, in situ, in a process without the need to install a similar redundant measurement.

Aspects of the present invention are related to a method for validating an invasive temperature measurement system, a validating device and a computer program with subject matter as described in the independent claims.

In this entire description of the invention, the sequence of procedural steps is presented in such a way that the process is easily comprehensible. However, the skilled person will recognize that many of the process steps can also be executed in a different order and lead to the same or a corresponding result. In this sense, the sequence of the process steps can be changed accordingly. Some features are provided with counting words to improve readability or to make the assignment more clear, but this does not imply the presence of certain features.

To achieve these and other advantages and in accordance with the purpose of the invention, as embodied and broadly described herein, there is provided a method for validating an invasive temperature measurement system, including the following steps: In a first step, a first temperature data of the temperature measurement system of a medium is provided, wherein the medium is surrounded by a vessel wall enclosing the medium. In a further step, a second temperature data of a non-invasive temperature measurement system is provided, wherein the non-invasive temperature measurement system is thermally contacting an outside surface of the vessel wall enclosing the medium. In a further step, a temperature of the medium is determined based on the second temperature data medium properties and properties of the vessel wall. In a further step, the first temperature data is compared with the determined temperature of the medium to validate the invasive temperature measurement system.

BRIEF DESCRIPTION OF THE SEVERAL VIEWS OF THE DRAWING(S)

DETAILED DESCRIPTION OF THE INVENTION

Figures 1, 2:
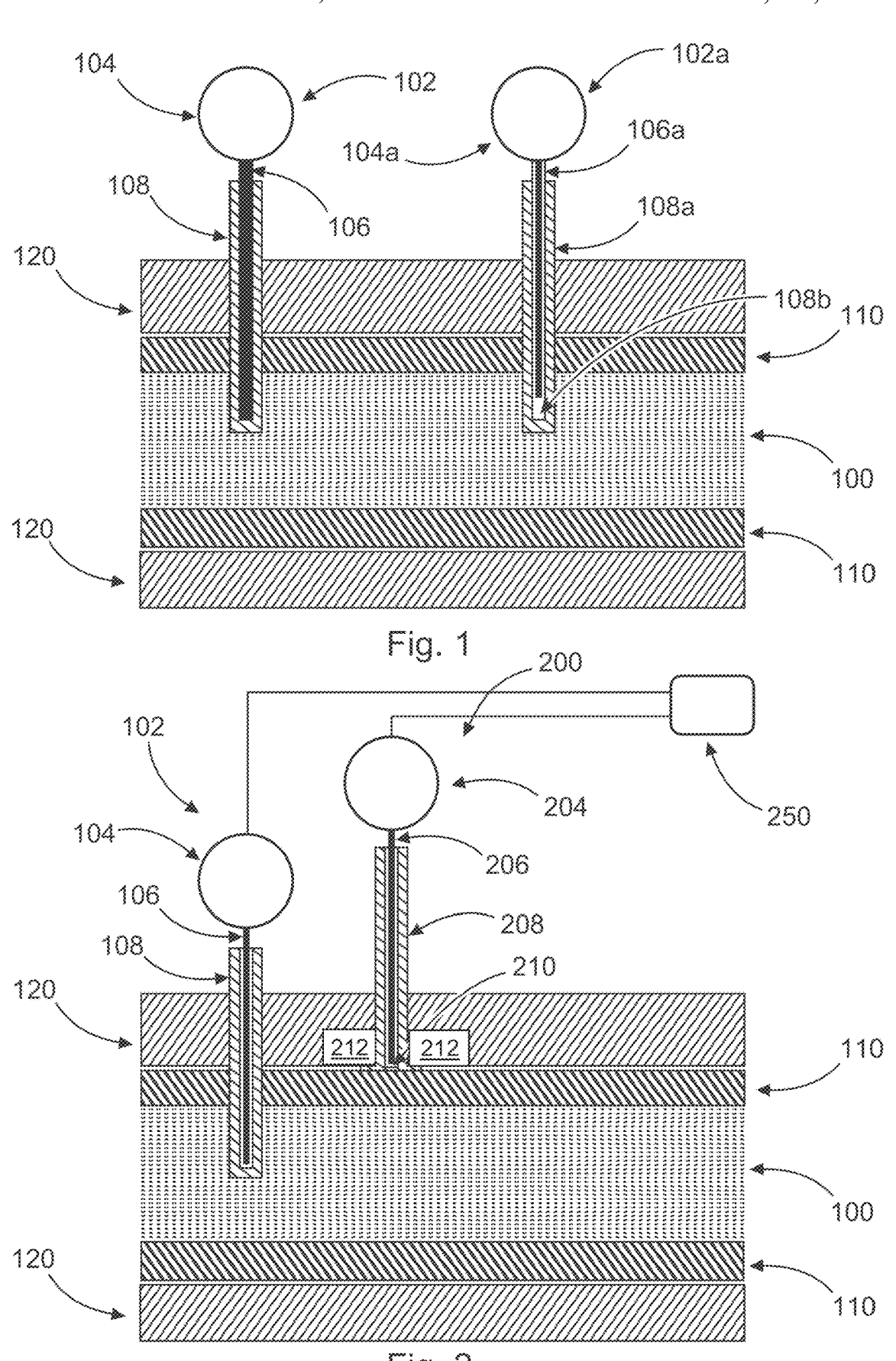
FIG. 1 is a schematic drawing of two thermowell-based temperature measurement systems in accordance with the disclosure.
FIG. 2 is a schematic drawing of a thermowell-based temperature measurement system and a non-invasive temperature measurement system mounted at a tube for determining a medium temperature, in accordance with the disclosure.

FIG. 1 sketches schematically two invasive thermowell-based temperature measurement systems, explaining disadvantages of these measurement systems. The thermowell-based temperature measurement system 102 on the left side of FIG. 1 sketches schematically a fitting temperature sensing system 106 placed into the thermowell 108, the thermowell protecting the temperature sensor against the media 100, which is a fluid within the pipe 110, wherein the pipe is thermally insulated by the insulation layer 120. The measurement system 102 having a sensor electronics 104 electrically connected to the temperature sensing system 106.

In comparison to the thermowell-based temperature measurement system 102*a* on the right side of the FIG. 1 a drawback of the thermowell-based temperature measurement system 102*a* is shown, wherein the temperature sensing system 106*a* is not fitting the inner diameter of the thermowell 108*a* and wherein the temperature sensing system 106*a* is not long enough to fit to the length of the opening of the thermowell. Because the sensing system 106*a* does not fit the thermowell 108*a*, a temperature measurement using such a thermowell-based temperature measurement system 102*a* can generate incorrect temperature measurements.

FIG. 2 sketches schematically a tube with the tube wall 110 enclosing the medium 100, wherein the thermowell-based temperature measurement system 102 as described in respect of FIG. 1 is invasive placed within the tube. In addition, a non-invasive temperature measurement system 200 is thermally contacting the outside surface of the tube wall 110 at the side 210 using an adapter structure 212, wherein the non-invasive temperature measurement system 200 with a sensor electronics 204 electrically connected to the temperature sensing system 206 is placed within the protection tube 208.

A validating device 250 is provide with the first temperature data reading of the invasive thermowell-based temperature measurement system 102 and the second temperature data reading of the non-invasive temperature measurement system 200 to validate the invasive thermowell-based temperature measurement system 102 as described above.

Figure 3:
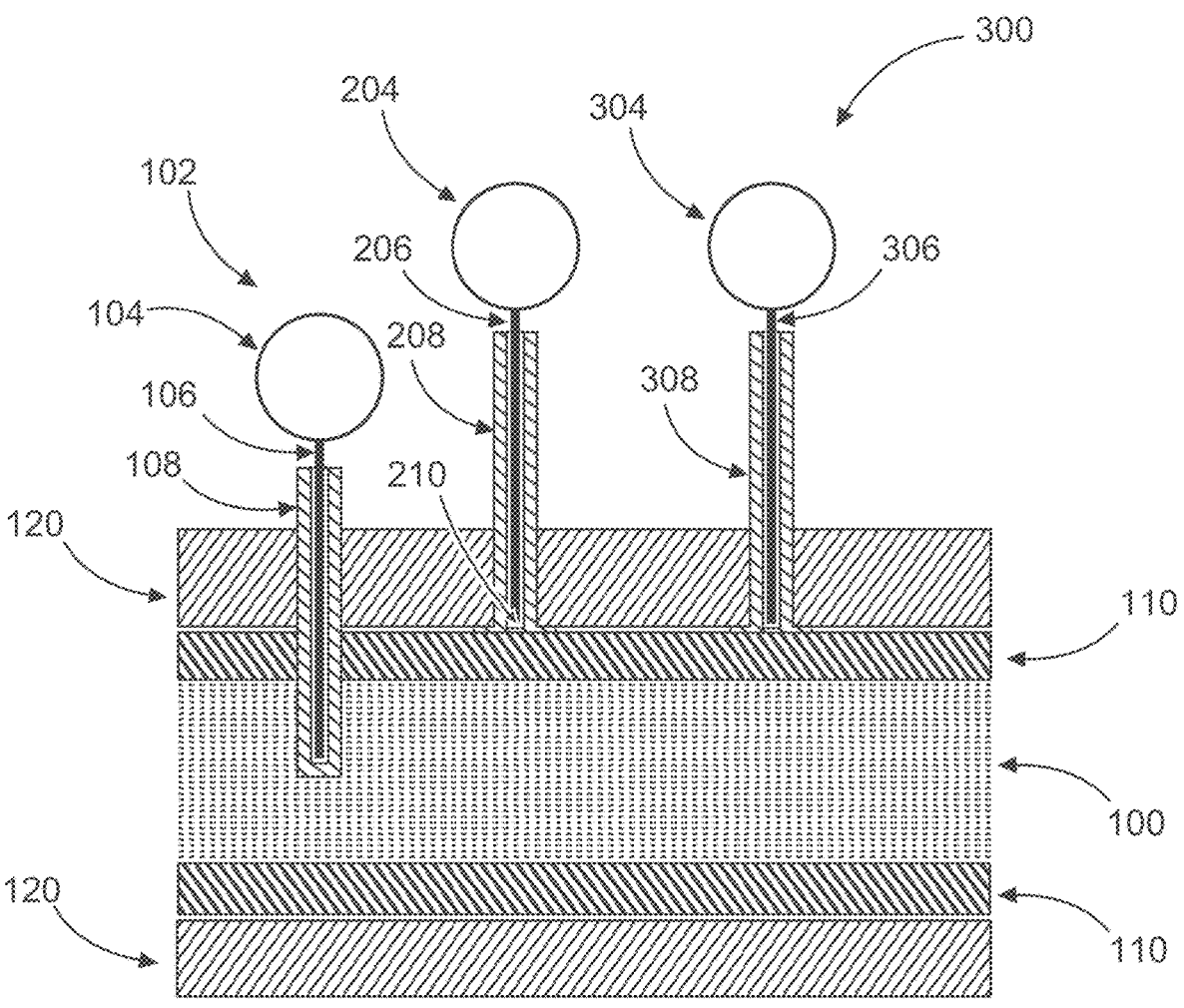
FIG. 3 is a schematic drawing of a thermowell-based temperature measurement system and two non-invasive temperature measurement systems mounted at a tube for determining a medium temperature, in accordance with the disclosure.

FIG. 3 corresponds to FIG. 2 but includes an additional non-invasive temperature measurement system 302 to sketch schematically a system wherein the determination of the temperature of the medium is based by two non-invasive temperature measurement system thermally contacting the outside of the tube wall surface 110. The second non-invasive temperature measurement system 300 with a sensor electronics 304 electrically connected to the temperature sensing system 306 is placed within the protection tube 308 to determine a surface temperature of the tube wall 110.

According to an aspect, the determination of the temperature of the medium, as described above, can be model based, and wherein the model includes a heat transfer characteristics of a boundary layer of the medium and/or a heat transfer characteristics of a segment of the vessel wall enclosing the medium. Using such a model to determine the temperature of the medium improves the accuracy of the determination.

The model makes use of knowledge of application, i.e., e.g., process- and/or plant- and/or ambient, parameters which can be specified by the user, either directly via numerical values, or indirectly, e.g. via specification of material types. Lookup tables can be used to translate the latter into numerical inputs for the model. The user can, e.g. be guided through a program menu which asks systematically for these data. The term vessel, as understood here, can include any wall enclosing the medium, as for instance a tube, a pipe or a tank or container etc.

The invasive, e.g. thermowell-based, temperature measurement system can e.g. have the resistive temperature measurement device or a Thermocouple as a temperature sensing system, wherein the temperature sensing system is electrically connected to a sensor electronics for provision of a temperature measurement reading. The temperature sensing system of the invasive temperature measurement system can be placed within a thermowell or similar package, which is typically mounted invasively through the vessel wall or into the vessel wall to contact the medium within the vessel. That means the term invasive temperature measurement system includes any temperature measurement system, where placing the system for performing the measurement violates or breaks the vessel wall in some way, in particular by an at least partial penetration of the wall by the temperature measurement system. This includes, for instance, temperature measurement systems which are protected by other packaging as by thermowells and/or uncovered inset rods hold by a tight connection to the wall.

The medium can be any fluid including a liquid and/or gas and/or a bulk material or any mixture of these like aerosols and multi-phase flows. Validating the invasive temperature measurement system by comparing the first temperature data with the determined temperature of the medium can be defined by a range for the deviation of these two temperature readings.

For validating the performance, respectively the accuracy, of an invasive temperature measurement system a model-based calculation can be used to determine the temperature of the medium based on a temperature reading determined by a non-invasive temperature sensor that accurately measures the surface temperature of the surface of the vessel wall. The determined temperature of the medium can be compared to the temperature reading of the invasive temperature measurement system to validate the invasive temperature measurement in case the deviation is below a predetermined limit value.

When specifying this limit value, or tolerance, one can also use knowledge regarding typical differences between the invasive measurement at hand and the medium temperature. The model-based calculation can be performed by a software tool that predicts the medium temperature based on the outer surface temperature of the vessel wall determined by the non-invasive temperature measurement system.

When the temperature difference is greater than the above mentioned calculated and application-dependent tolerance or limit value, which may be based on error stacking, it can be presumed that the invasive measurement is out of tolerance and the necessary remedial steps can be taken or recommended to the user.

Beneficially, the provision of the surface temperature using a non-invasive sensor technology, as described below, can be traced back to a calibration standard for the approach of a surface contact measurement. This is because the accuracy of the non-invasive sensor temperature measurement system, as described below, can be performed including a determination of an uncertainty value. The latter is based on traceable sensors used within the non-invasive temperature measurement system and a subsequent uncertainty calculation, e.g. according to the GUM-standard. This is a difference to most invasive, e.g., thermowell-based, temperature measurement systems because of the usually complicated geometry of the invasive, e.g., thermowell-based, temperature measurement system, which does not allow for a simple and transparent uncertainty calculation and may result in uncertain thermic model calculations in general.

A problem determining the medium temperature using invasive temperature measurement systems only is, that with low flowrates, natural convection could affect the measurement accuracy, because invasive temperature measurement systems fail to measure a cross-sectional area averaged temperature of the medium.

Using this method for validating an invasive temperature measurement system can cost-effectively enhance the confidence of temperature measurements readings as used in the process industry and may improve the process quality.

According to an aspect, the non-invasive temperature measurement system is thermally contacting the outside of the vessel wall enclosing the medium within a vicinity of the invasive measurement system. Such a vicinity can be defined as sufficiently close if the distance between the two temperature measurement systems is approximately within one diameter of the vessel, e.g., a pipe, and/or in the range of the penetration depth of the invasive measurement, e.g., not significantly more than ten times the penetration depth of the thermowell or an uncovered inset rod into the medium. The distance can be chosen larger if a flow within the vessel, e.g., a pipe, is hydrodynamically and thermally fully developed.

According to an aspect, the non-invasive temperature measurement system is thermally contacting the outside of the vessel wall at a site on a circumferential line of the vessel at a 90 degree angle in respect to the invasive temperature measurement system, wherein the circumferential line, preferably approximately, includes an installation site of the invasive temperature measurement system.

Using other words, the non-invasive temperature measurement system is thermally contacting the outside of the vessel wall at a site of the perimeter of the vessel at approximately a 90-degree angle from the invasive measurement point, wherein the vessel perimeter approximately includes an installation site of the invasive temperature measurement system. Particularly the non-invasive temperature measurement system is thermally contacting the outside of the vessel wall at a site of the perimeter or on the circumferential line of the vessel within a range of an angle of about 10 degree to both sides at an approximately 90-degree angle from the invasive measurement point, wherein the vessel perimeter and/or the circumferential line of the vessel approximately includes the installation site of the invasive temperature measurement system.

One can generally use several non-invasive sensors for the calibration, doing corresponding averaging or other statistical analysis and signal processing with the generated data. The non-invasive sensors can be installed upstream from the invasive probe, or symmetrically upstream and downstream, because of the disturbed boundary layer caused by the invasive temperature measurement system. Alternatively, the non-invasive temperature measurement system is installed at the 90° angle with the invasive temperature measurement system, e.g. in order to minimize an influence of the invasive measurement system on the local boundary layer thickness of the medium.

According to an aspect, the non-invasive temperature measurement system is thermally contacting the outside of the vessel wall enclosing the medium at a site, which is upstream, preferably upstream in respect to a stream of the medium inside of the vessel, of the invasive measurement system.

According to an aspect, the non-invasive temperature sensor system is thermally contacting the vessel wall enclosing the medium by use of an adapter structure for easy mounting the non-invasive temperature sensor system. The adapter structure can be fixed, e.g., clamped or slightly welded, to the pipe, and its connection to the remaining parts of the non-invasive temperature measurement system, containing, e.g., the sensor elements, the measurement electronics etc., can be easily detached and re-connected many times, by using screwed, flanged, compressed, clamped, or other joint types.

Using such an adapter structure enables temporary mounting of the non-invasive temperature measurement system if a temperature reading at that site is necessary. Such an adapter structure can be for instance a mechanical means clamped to the vessel and providing a means, as for instance a threat, for mounting a protection tube such as a neck tube, for the sensing system of the non-invasive temperature measurement system. Alternatively or additionally, the protection tube such as a neck tube may be fixed, clamped or slightly welded, detachably or undetachably, mounted at the vessel surface for temporarily measuring the temperature of the outer surface of the vessel.

Such a protection tube can vary in height to fit the thickness of any insulation of the vessel. Such a protection tube may be installed next to every invasive temperature measurement system of a facility to check the temperature when needed. The protection tube may be hollow with one end opening to the surface of the vessel wall. A sensing system of the non-invasive temperature sensor system can be fed into this protective tube such that it is brought into contact with the vessel wall surface at that point even after an installation and/or an insulation is mounted at the vessel wall.

The connection of the protection tube to the remaining parts of the non-invasive temperature measurement system, containing e.g. the sensor elements, the measurement electronics etc., can be easily detached and re-connected many times, by using e.g. screwed, flanged, compressed or clamped joints. An advantage of such a permanently mounted protection tube is, that it enables the outer surface temperature determination without removing or changing the installation, especially possible insulation layers, of the vessel. If not in use, the protection tube may be closed tightly by a plug or screw. Such an adapter structure eliminates the need for installing an additional invasive, e.g. thermowell-based, temperature measurement system for verification of an invasive, e.g. thermowell-based, temperature measurement system.

According to an aspect of the disclosure, the temperature of the medium is based on a plurality of temperature data provided by a corresponding plurality of non-invasive temperature measurement systems thermally contacting the outside of the surface enclosing the medium at different sites or locations. At least a part of the plurality of non-invasive temperature measurement systems can be installed at a site, which is upstream, preferably in respect to a stream of the medium inside of the vessel, from the invasive probe and/or symmetrically to the invasive temperature measurement system.

The temperature data provided may include data of at least two non-invasive temperature sensor systems. Using a plurality of non-invasive temperature measurement systems may enhance a confidence of the surface temperature measurement and thereby increasing the veracity of the validation method.

This is especially true in cases where the measurement is taken within the hydrodynamic or thermal entry length of the vessel. In such a case one to three non-invasive temperature measurement systems may be used for improved surface temperature measurement determination. This applies in particular to invasive measurements, particularly thermowells, which are installed at or in close vicinity, preferably the close vicinity not exceeding one diameter of the vessel, of tube or pipe bends. Here conjugate heat transfer is strongly position dependent. Using a plurality of non-invasive temperature measurement systems can account for circumferential surface temperature variation.

Multiple tubes may be installed circumferentially around the pipe wall and the readings of the plurality of systems can be fused. This is to account for circumferential variation in temperature in the downstream of flow distorting features likes bends, T-junctions etc.

According to an aspect, the plurality of non-invasive temperature measurement systems is located at sites on a circumferential line of the vessel surface; and the determination of the temperature of the medium is based on the plurality of temperature data of the corresponding non-invasive temperature measurement systems.

The temperature of the medium can be a fusion of the plurality of temperature data of the corresponding non-invasive temperature measurement systems, wherein such a fusion can be any functional relationship between the plurality of temperature data, for instance a functional relationship can define an average value of the corresponding plurality of temperature data of the medium.

Using a plurality of non-invasive temperature measurement systems can account for circumferential surface temperature variation, e.g. in the downstream of flow distorting features likes bends, T-junctions etc. For instance, in case a circumferential temperature difference exceeds one Kelvin at any side corresponding to a 2 to 4 Kevin temperature difference a non-invasive temperature measurement system can be mounted at the vessel wall.

According to an aspect, the determination of the temperature of the medium is based on the plurality of temperature data, which is provided using a thermal imager for determining temperatures at different sites of the surface of the vessel wall.

According to an aspect, the temperature variations of regions of the surface of the vessel wall are determined using a thermal imager, e.g. an infrared camera, for determining a plurality of temperatures at different sides of the surface of the vessel wall.

For this method, a hand held thermal imager can be used occasionally by inspection engineers to check possible temperature variation across a pipe wall and a correction of the surface temperature measurement may be performed accordingly. Using these thermal images can provide another way to determine temperature variations across the vessel to determine a plurality of temperature data. If the variation of a vessel surface temperature is larger than a tolerance value, e.g. a stratification warning can be issued, or the simulated calculated temperature of the medium can be adjusted accordingly. The warning can be accompanied by a recommendation to use more than one non-invasive measurement systems for calibration. It may be recommended also to locate them e.g. at a perimeter or perimeter line, respectively a circumferential line, of the pipe, close to the invasive measurement point to be checked.

According to an aspect, the second temperature data of a non-invasive temperature measurement system is based on a main temperature reading of a main temperature sensing system and at least one reference temperature reading provided by the non-invasive temperature measurement system for compensating a thermal resistance between the main temperature sensor and the medium.

A non-invasive temperature measurement system can be provided by two temperature sensing systems thermally coupled by a distance to the surface, wherein the main sensing system is placed closer to the surface to provide a surface temperature and the second sensing system, a reference sensing system, can be placed with a distance to the surface to provide the reference temperature to improve the accuracy of the surface temperature reading of the non-invasive temperature measurement system using a temperature measurement model calculation taking into account a heat flow relevant to determine the surface temperature of the vessel wall.

According to an aspect the medium properties comprise a type of a phase and/or a density and/or a dynamic viscosity and/or a thermal conductivity and/or a specific heat capacity and/or a Prandtl number and/or a phase state and/or a velocity and/or a flow rate and/or a pressure difference of the media defining the flow rate, of the medium.

The material property of the fluid may be a density $\rho$, a dynamic viscosity $\eta f$, a thermal conductivity $\lambda f$, a specific heat capacity $cp$, a Prandtl number $Pr$ and/or a phase state of the fluid. The state variable of the fluid may be a pressure $p$ or a velocity $v$.

At least as a first estimate, the nominal values of the medium properties and the phase state can be used for the determination of the temperature of the medium. The type of a phase of the medium within the vessel may be a liquid and/or a gas and/or a steam and/or a multiphase.

According to an aspect of the disclosure, the determining of the temperature of the medium is based on a type of the material of the vessel wall and/or geometric dimensions of the vessel wall and/or a distance of the invasive temperature measurement system from a nearest upstream feature, which is located at a site in an upstream direction, and/or a thickness of an installation of the vessel and/or an insertion depth of the invasive temperature measurement system and/or thermal conductivity of the insolation of the vessel.

A type of the material of the vessel can be broadly classified into metallic, plastic or layered materials. Dimensions of the vessel, like a wall thickness and/or an inner diameter may be selected from standard dimensions. The thickness and thermal conductivity of the insulation can be taken into account if applicable to the vessel. The insertion depth of the invasive temperature measurement system can cause buoyancy or natural convection induced by thermal stratification for low flowrates. For definition of a location or site of the measurement point a nearest upstream feature like a bend and/or a valve and/or an orifice can be taken into account.

According to an aspect, the model for determination of the temperature of the medium is described by Formula 1:

$$T_M = T_{wa}\left[1 + \frac{R_{bl} + R_w}{R_F}\right] - T_e\frac{R_{bl} + R_w}{R_F} \qquad (1)$$

where $T_M$ is a temperature of the media; $T_{wa}$ is a temperature of a segment of the vessel wall (outer surface); $T_e$ is a reference temperature of the non-invasive temperature measurement system; $R_{bl}$ is a thermal resistance of a boundary layer of the medium within the vessel; $R_W$ is a thermal resistance of a segment of the wall of the vessel; and $R_F$ is an approximation of the thermal resistance between the vessel wall's outer surface and the reference temperature measurement point. The thermal resistances can be derived from the collected application parameters.

For determination of the temperature of the medium thermal stratification within the vessel can be taken into account for natural convection induced temperature stratification within a pipe fluid, under low flow rates, may result in incapability to determine a medium temperature using an invasive, e.g. thermowell-based, temperature measurement system only, for measuring a pipe cross-sectional area averaged temperature.

Stratification can be measured by circumferential assembly of non-invasive temperature measurement systems as mentioned above. Suitable fusion and/or functional relationship and signal processing of these measurement data, e.g. simple averaging, can be put into correspondence to the invasive reading and used for validation of the latter.

A validating device is provided, including an input interface, which is configured to receive at least a first temperature data of an invasive temperature measurement system of a medium; and is configured to receive a second temperature data of a non-invasive temperature measurement system. The validating device includes a data processing device, which is configured to perform one of the methods for validating an invasive temperature measurement system as described above.

Using other words, the validating device is configured to perform one of the methods described above. Using such a device, the corresponding method can be easily integrated into different systems.

According to an aspect, the validating device includes means for generating a warning signal and/or means for generating an error message; and wherein the data processing device is configured to generate a warning signal and/or an error message, if a difference of the first temperature data and the determined temperature of the medium (100) exceeds a specified first limit value.

Using other words, the validating device is configured to generate a warning signal and/or an error message, if a difference of the first temperature data and the determined temperature of the medium exceeds a specified first limit value.

According to an aspect, the validating device is configured to generate a warning signal and/or an error message, if, by means of a time-based statistical analysis of the first temperature data and the determined temperature of the media, a statistical value is determined, which exceeds a specified second limit value.

Using other words, the validating device is configured to generate a warning signal and/or an error message, if a statistical analysis of the first temperature data and the determined temperature of the media, determined at a plurality of points in time, exceeds a specified second limit value. For this, the first limit value and the second limit value can be a same value.

According to another aspect, a computer program, particularly an app, comprising instructions is disclosed, which, when the program is executed by a computer, cause the computer to carry out one of the described methods, wherein particularly the computer program is at least based on a provided first temperature data of the invasive temperature measurement system of a medium and on a provided second temperature data of a non-invasive temperature measurement system. For providing and processing the at least first temperature data and the second temperature data the computer program can include at least a first variable and a second variable. Such a computer program enables the use of the described method in different systems.

According to another aspect of the present invention, a computer-readable storage medium is disclosed on which the computer program is stored.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for validating an invasive temperature measurement system, comprising:

providing a first temperature data of the invasive temperature measurement system of a medium, the medium surrounded by a vessel wall enclosing the medium;

providing a second temperature data of a non-invasive temperature measurement system, the non-invasive temperature measurement system thermally contacting an outside surface of the vessel wall enclosing the medium to measure the surface temperature of the surface of the vessel wall;

determining a temperature of the medium based on the second temperature data, medium properties and properties of the vessel wall;

wherein the determination of the temperature of the medium is model based, and wherein the model includes a heat transfer characteristics of a boundary layer of the medium; and comparing the first temperature data with the determined temperature of the medium to validate the invasive temperature measurement system.

2. The method according to claim 1, wherein the non-invasive temperature measurement system is thermally contacting an outside surface of the vessel wall enclosing the medium within a spatial vicinity of the invasive measurement system not exceeding one diameter of the vessel.

3. The method according to claim 1, wherein the non-invasive temperature measurement system is thermally contacting an outside surface of the vessel wall at a site on a circumferential line of the vessel at a 90 degree angle in respect to a surface the vessel, and wherein the circumferential line includes an installation site of the invasive temperature measurement system.

4. The method according to claim 1, wherein the non-invasive temperature measurement system is thermally contacting an outside surface of the vessel wall enclosing the medium at a site, which is upstream, in respect to a stream of the medium inside of the vessel, of the invasive measurement system.

5. The method according to claim 1, wherein the non-invasive temperature sensor system is thermally contacting a vessel wall enclosing the medium by use of an adapter structure for easy mounting the non-invasive temperature sensor system.

6. The method according to claim 1, wherein the determination of the temperature of the medium is based on a plurality of temperature data provided by a corresponding plurality of non-invasive temperature measurement systems thermally contacting an outside of a surface enclosing the medium at different sites.

7. The method according to claim 6, wherein the plurality of non-invasive temperature measurement systems is located at sites on a circumferential line of the vessel surface; and the determination of the temperature of the medium is based on the plurality of temperature data of the corresponding non-invasive temperature measurement systems.

8. The method according to claim 6, wherein the determination of the temperature of the medium is based on the plurality of temperature data provided using a thermal imager for determining temperatures at different sites of the surface of the vessel wall.

9. The method according to claim 1, wherein the second temperature data of a non-invasive temperature measurement system is based on a main temperature reading of a main temperature sensing system and at least one reference temperature reading provided by the non-invasive temperature measurement system for compensating a thermal resistance between the main temperature sensor and the medium.

10. The method according to claim 1, wherein the determination of the temperature of the medium is model based, and wherein the model further includes a heat transfer characteristics of a heat transfer characteristics of a segment of the vessel wall enclosing the medium.

11. A validating device, comprising:

an input interface configured to:

receive at least a first temperature data of an invasive temperature measurement system of a medium; and receive a second temperature data of a non-invasive temperature measurement system; and a data processing device, the data processing device configured to:

provide a first temperature data of the invasive temperature measurement system of a medium, the medium surrounded by a vessel wall enclosing the medium;

provide a second temperature data of a non-invasive temperature measurement system, the non-invasive temperature measurement system thermally contacting an outside surface of the vessel wall enclosing the medium to measure the surface temperature of the surface of the vessel wall;

determine a temperature of the medium based on the second temperature data, medium properties and properties of the vessel wall;

wherein the determination of the temperature of the medium is model based, and wherein the model includes a heat transfer characteristics of a boundary layer of the medium; and compare the first temperature data with the determined temperature of the medium to validate the invasive temperature measurement system.

12. The validating device according to claim 11, further comprising generating a warning signal and/or generating an error message; and wherein the data processing device is configured to generate a warning signal and/or an error message when a difference of the first temperature data and the determined temperature of the medium exceeds a specified first limit value.

13. The validating device according to claim 12, further comprising generating a warning signal and/or an error message when, based on a time-based statistical analysis of the first temperature data and the determined temperature of the media, a statistical value is determined, which exceeds a specified second limit value.

* * * * *